(12) United States Patent
Froeschle et al.

(10) Patent No.: US 8,960,766 B2
(45) Date of Patent: Feb. 24, 2015

(54) VEHICLE, IN PARTICULAR CABRIOLET VEHICLE WITH A TOP BEARING

(71) Applicant: Dr. Ing. h.c. F. Porsche Aktiengesellschaft, Stuttgart (DE)

(72) Inventors: Mathias Froeschle, Ostfildern (DE); Florian Dahm, Neuhausen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 14/273,931

(22) Filed: May 9, 2014

(65) Prior Publication Data

US 2014/0339852 A1    Nov. 20, 2014

(30) Foreign Application Priority Data

May 15, 2013   (DE) .......................... 10 2013 105 013

(51) Int. Cl.
   *B60J 7/00*      (2006.01)
   *B60J 7/185*    (2006.01)
(52) U.S. Cl.
   CPC ..................................... *B60J 7/1855* (2013.01)
   USPC .......................................... 296/124; 296/128
(58) Field of Classification Search
   USPC ........................... 296/124, 125, 128, 132, 133
   See application file for complete search history.

(56) References Cited

U.S. PATENT DOCUMENTS

| | | | |
|---|---|---|---|
| 5,975,619 A | 11/1999 | Dettling et al. | |
| 7,216,921 B2 | 5/2007 | Habacker | |
| 7,780,218 B2 | 8/2010 | Habacker | |
| 7,784,850 B2 | 8/2010 | Feussahrens et al. | |
| 8,029,039 B2 * | 10/2011 | Hinrichs | 296/121 |

FOREIGN PATENT DOCUMENTS

| | | |
|---|---|---|
| DE | 196 35 869 | 1/1998 |
| DE | 100 39 683 | 3/2002 |
| DE | 10 2005 034 725 | 1/2007 |
| EP | 1 595 729 | 11/2005 |
| EP | 2 033 826 | 3/2009 |
| EP | 1 562 769 | 1/2011 |
| WO | 2006/005320 | 1/2006 |
| WO | 2006/045269 | 5/2006 |

OTHER PUBLICATIONS

German Search Report of Dec. 17, 2013.

\* cited by examiner

*Primary Examiner* — Joseph D Pape
(74) *Attorney, Agent, or Firm* — Gerald E. Hespos; Michael J. Porco; Matthew T. Hespos

(57) ABSTRACT

A cabriolet vehicle has a top system (2) that can be stowed in a rear-end stowage compartment (7). The top system (2) is held in the stowage compartment (7) by a support with a hinge element (9) having a horizontally pivotable hinge arm (11) and a top bearing (8) integrated in the hinge arm (11). The hinge arm (11) has a drive device (12) actuable by a roof link (30) of the top system (2) and configured to pivot the hinge arm (11) about a vertical axis (10) from a folded-in rest position (R), in which the hinge arm (11) is oriented transversely in the vehicle (1), into a folded-out bearing position (A), in which the hinge arm (11) extends in the vehicle longitudinal direction and in which the top bearing (8) receives a support (14) of a roof element (5) of the top system (2).

9 Claims, 6 Drawing Sheets

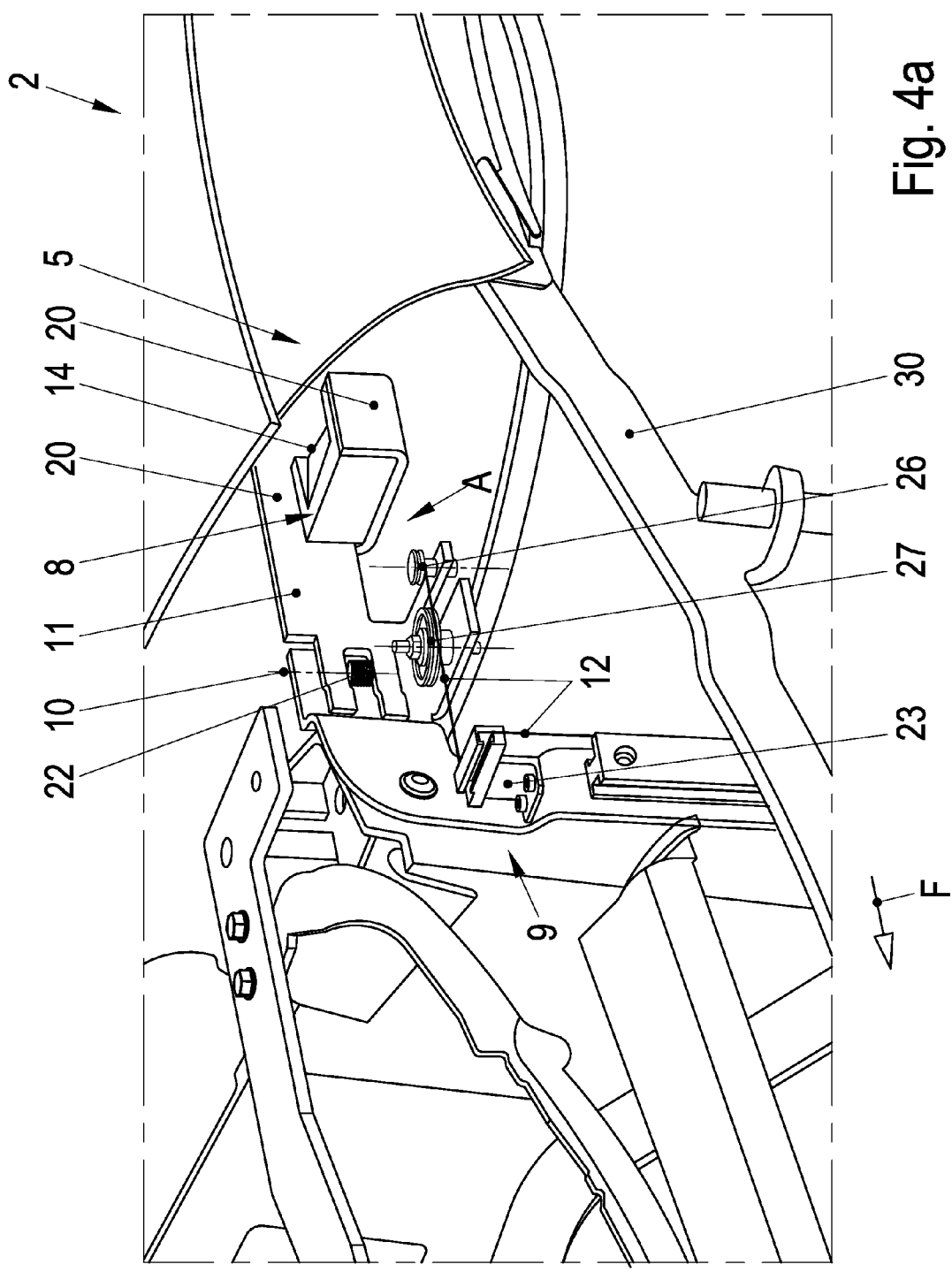

VEHICLE, IN PARTICULAR CABRIOLET VEHICLE WITH A TOP BEARING

CROSS REFERENCE TO RELATED APPLICATION

This application claims priority under 35 USC 119 to German Patent Appl. No. 10 2013 105 013.1 filed on May 15, 2013, the entire disclosure of which is incorporated herein by reference.

BACKGROUND

1. Field of the Invention

The invention relates to a cabriolet vehicle having a top or roof system that can be stowed in a rear-end stowage compartment. The top or roof system has at least one front roof element and a rear window arranged in a top lining. The top system, in a bearing position, is held in the stowage compartment a support.

2. Description of the Related Art

EP 2 033 826 B1 discloses a cabriolet vehicle having a stowable roof arrangement. A top linkage enables the roof to be moved in continuous fashion from a closed position into a rear-end stowage position in a stowage box. A pivotable locking device is arranged in a lateral edge region of the stowage box. The locking device fixes the roof arrangement in the direction of the vehicle vertical axis once the roof arrangement has been moved into the stowage position.

An object of the invention is to provide a cabriolet vehicle with a top bearing for a roof system that makes enables the roof with integrated rear window to be stowed in a rear-end stowage compartment without obstruction from top bearings and other devices.

SUMMARY OF THE INVENTION

The invention relates to a top or roof system stowed in a rear-end stowage compartment of the vehicle without damage, and linkage parts or the like do not impact against one another and generate noise. For this purpose, the stowage compartment of the vehicle has a top bearing that is arranged on a horizontally pivotable hinge arm of a hinge element. The hinge arm has a cable drive device actuable by a roof link of the top system and is pivotable about a vertical axis from a folded-in rest position into a folded-out bearing position. The hinge arm is oriented transversely in the vehicle when in the folded-in rest position. Conversely, the hinge arm extends in the vehicle longitudinal direction when in a folded-out bearing position. The top bearing is arranged correspondingly to an end-side retention element of the roof element of the top system, and receives the retention element in positively locking fashion to fix the roof. The fact that the top bearing integrated in the hinge arm is pivotable from the rest position into the bearing position and vice versa advantageously assures that the top bearing does not obstruct other top components that are stowed during the stowage of the top, such as the rear window.

The top bearing remains in the rest position during the stowage of the top, until the components at risk of collision, in particular the rear window, have passed the constriction. Only thereafter is the top bearing pivoted into a receiving, active position.

The hinge element preferably comprises an upright hinge pillar that is held positionally fixed on a carrier. The hinge element also has a static hinge head that is arranged on a turned-up leg and that runs in the vehicle longitudinal direction and to which the pivotable hinge arm with the integrated top bearing is connected articulatedly for articulation about the vertical axis. The top bearing preferably is composed of a support part provided with side cheeks, and the retention element of the roof element. Thus the roof system is held between the cheeks of the support part in the y direction in the stowage position.

The pivotable hinge arm preferably has, between lugs, a rotary spring which is held on the vertical pivot axis and which holds the hinge arm in the folded-in rest position. By means of this arrangement and form of the hinge element, the top bearing can be moved into position in a controlled manner by means of the cable drive device such that, firstly, it is ensured that no collision with roof elements and linkages and with the rear window occurs, and secondly, it is ensured that the top element is securely held between the cheeks of the top bearing in the stowage position.

The rotary spring integrated into the hinge element ensures in all situations that, when the roof system is in a retracted state, the hinge arm with the top bearing is in a rest position, and the stowage position is not obstructed.

The cable drive device preferably is arranged between the pivotable hinge arm and the positionally fixed hinge pillar. The cable drive device may comprise a wire-type cable pull and may be connected to a carriage that is linearly adjustable in the hinge pillar in the z direction. The wire-type cable pull of the device is connected to the pivotable hinge arm via a fastening point and can be placed in engagement with the adjustable carriage via two redirection means on the hinge element and is adjustable with an action counter to the rotary spring for realization of the bearing position.

For adjustment purposes, the carriage may have a projecting stop for the roof link. When the stowage position of the top system is adopted, the roof link engages with the stop and, acting on the stop, seeks to move with the carriage into a lower position. The carriage of the cable drive device is guided linearly in a vertical direction on the hinge pillar, in a manner actuable preferably by a roof link or a linkage of the roof. Thus, when the roof is in the stowage position, the hinge arm can be pivoted from the rest position into the bearing position, and the top bearing made available, in due time. For positionally accurate arrangement of the top bearing at the roof support point, the hinge arm is positioned by the lugs on the hinge head so that the hinge arm is oriented exactly in the vehicle longitudinal direction.

The cable pull of the device preferably is guided over cable redirection means. One cable redirection means on the hinge head comprises a roller arranged on a turned-up leg, and the other cable redirection means comprises a guide path arranged on the leg of the hinge pillar. The connection of the cable pull to the carriage may preferably be realized by a tensile spring which serves for length compensation.

An exemplary embodiment of the invention is illustrated in the drawings and will be described in more detail below.

BRIEF DESCRIPTION OF THE DRAWINGS

FIG. 4a is a view of the top bearing in the bearing position as in FIG. 4, with, in the bearing position, a roof element of the top system stowed.

DETAILED DESCRIPTION OF THE PREFERRED EMBODIMENTS

Figure 1:
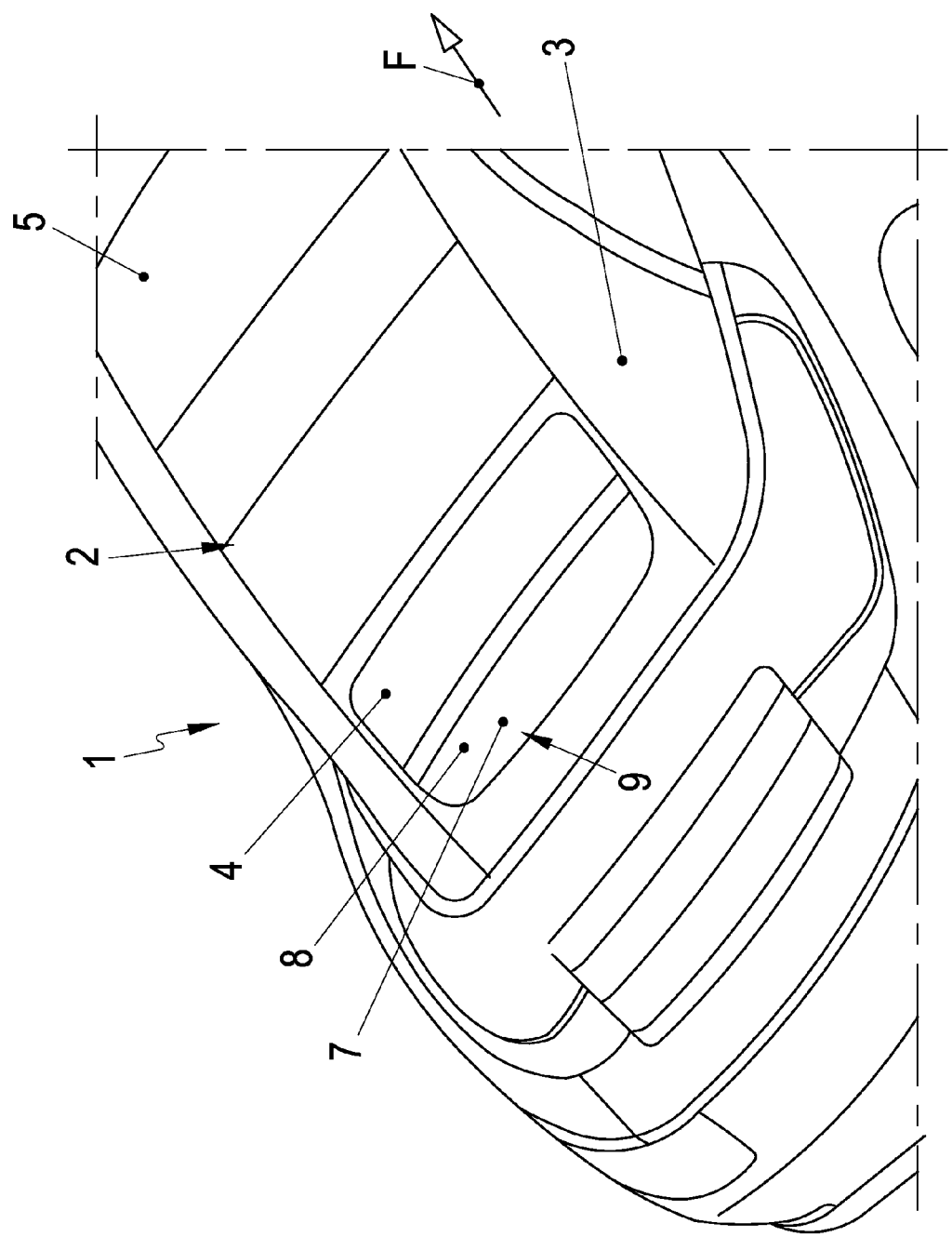
FIG. 1 is a view of a motor vehicle from the rear, with a closed top system and integrated rear window and indicated top bearing.
Figure 2:
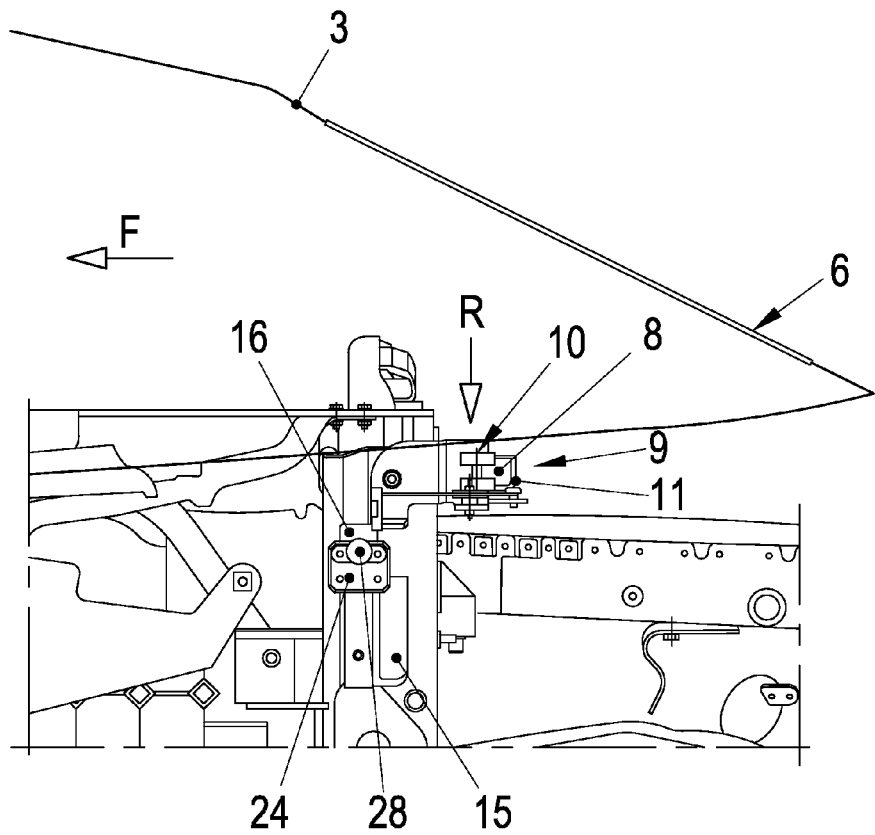
FIG. 2 is a side view of the top bearing in a rest position with the top system closed.
Figure 3:
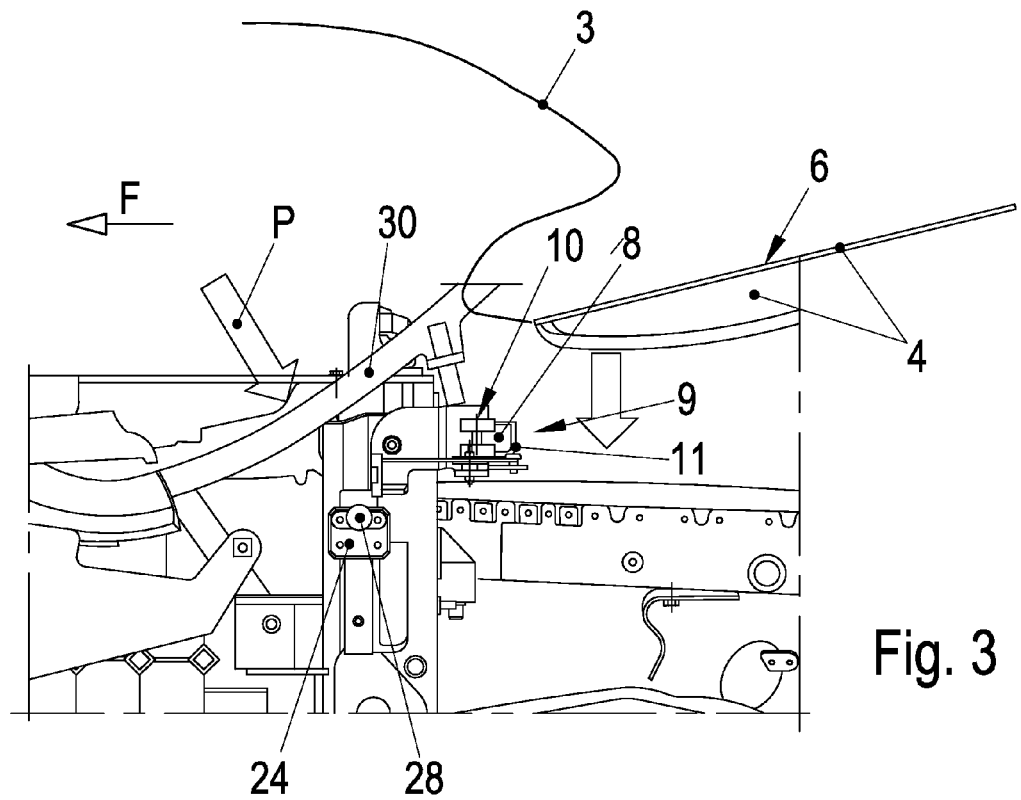
FIG. 3 is a side view of the top bearing in a rest position as the rear window is being lowered during the opening of the top system.

A cabriolet vehicle 1 has a roof or a top system 2 that may comprise one or more areal roof elements 5, a top lining 3 and an integrated rear window 4. A foremost areal roof element 5 rests on an edge of the windshield 6 when in a closed position and, when in an open position, is arranged in a rear-end stowage compartment 7 and held on a top bearing 8.

A rigid top bearing 8 could obstruct other top components that are stowed during the stowage of the top. Accordingly, the vehicle 1 has a bearing facility that is situated in a rest position R when the top system 2 is closed. During the stowage of the top system 2, the bearing 8 remains in its rest position R until the components at risk of collision have passed the constriction, and thereafter the bearing 8 is moved into its active or bearing position A. This movement ideally is effected by a roof link 30 or top component which, for example via a redirection means, initiates the pivoting-out of the top bearing 8 into the active or bearing position A.

The top bearing 8 is arranged on a hinge element 9. The hinge element 9 has a hinge arm 11 that is pivotable about a vertical axis. The hinge arm 11 can be pivoted about a vertical axis 10 by a cable drive device 12 from a folded-in rest position R, in which the hinge arm 11 is oriented transversely in the vehicle 1, into a folded-out bearing position A, in which the hinge arm 11 extends in the vehicle longitudinal direction. In the folded-out bearing position A, the top bearing 8 is arranged correspondingly to an end-side retention element or support element 14 of the roof element 5 and is held in positively locking fashion in the top bearing 8.

Figure 4:
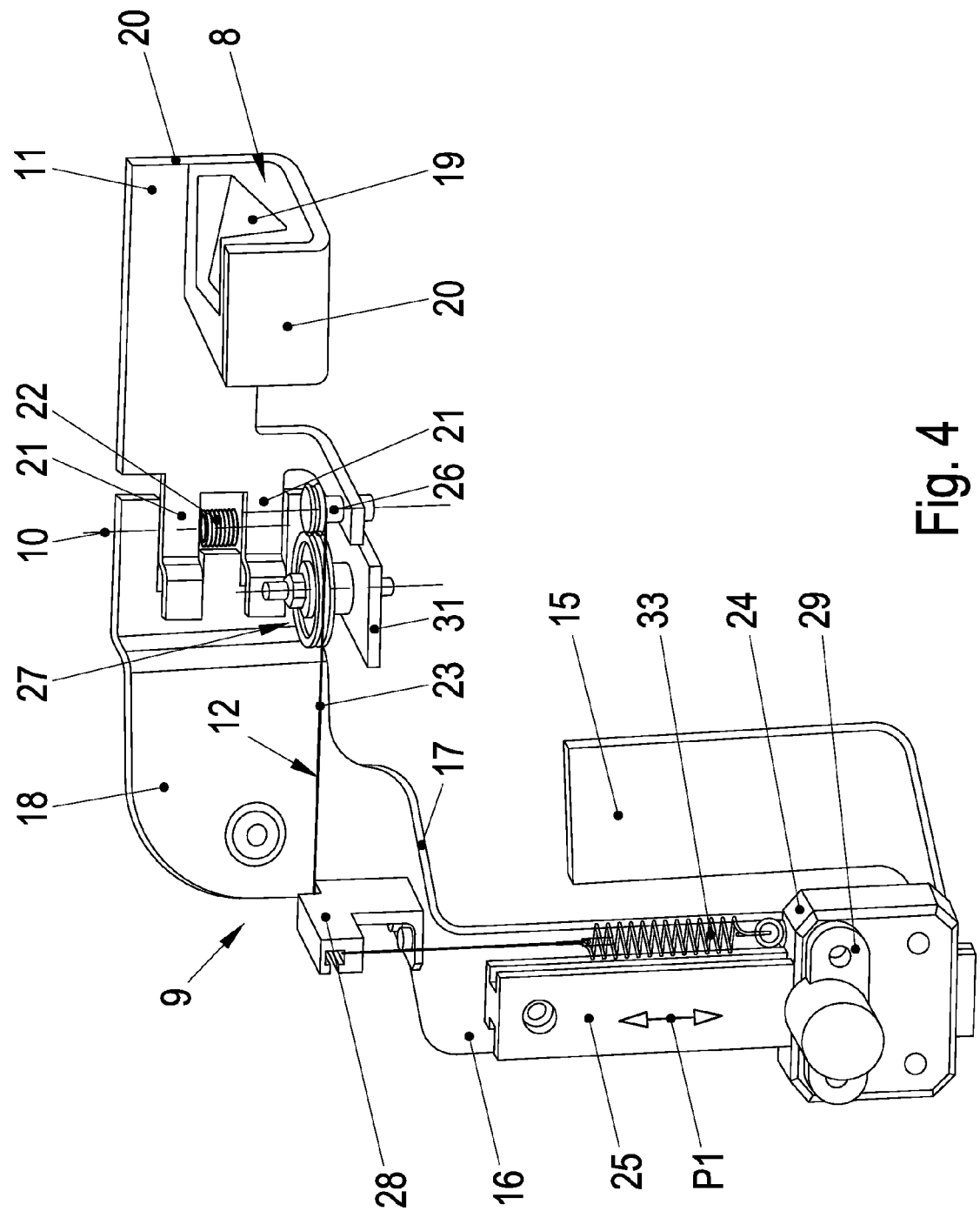
FIG. 4 is a view of the top bearing on the hinge element in a bearing position, with a cable drive device.
Figure 5:
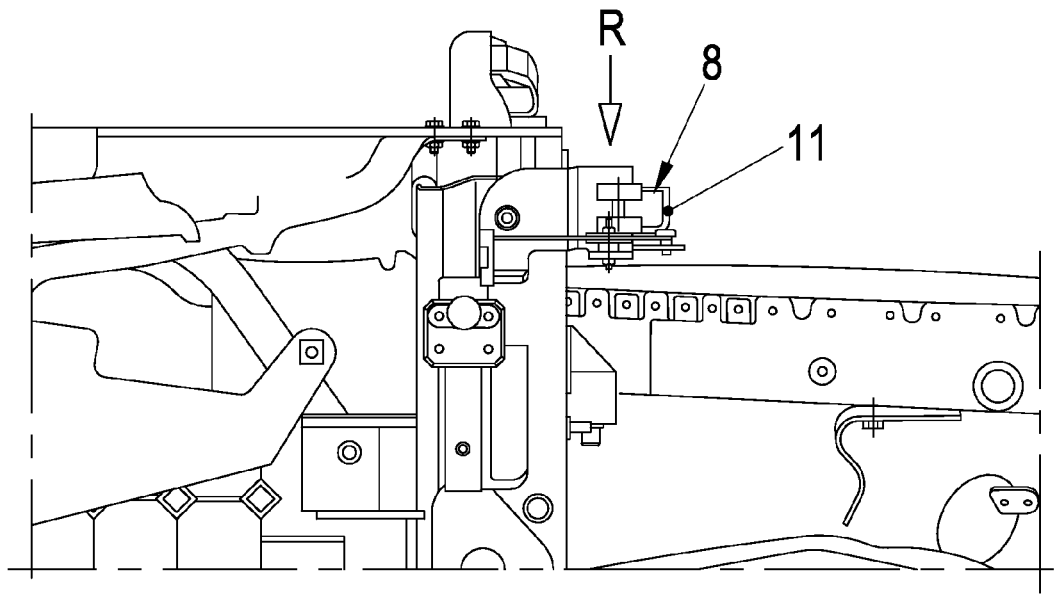
FIG. 5 is a side view of the hinge element in a folded-in rest position.
Figure 5A:
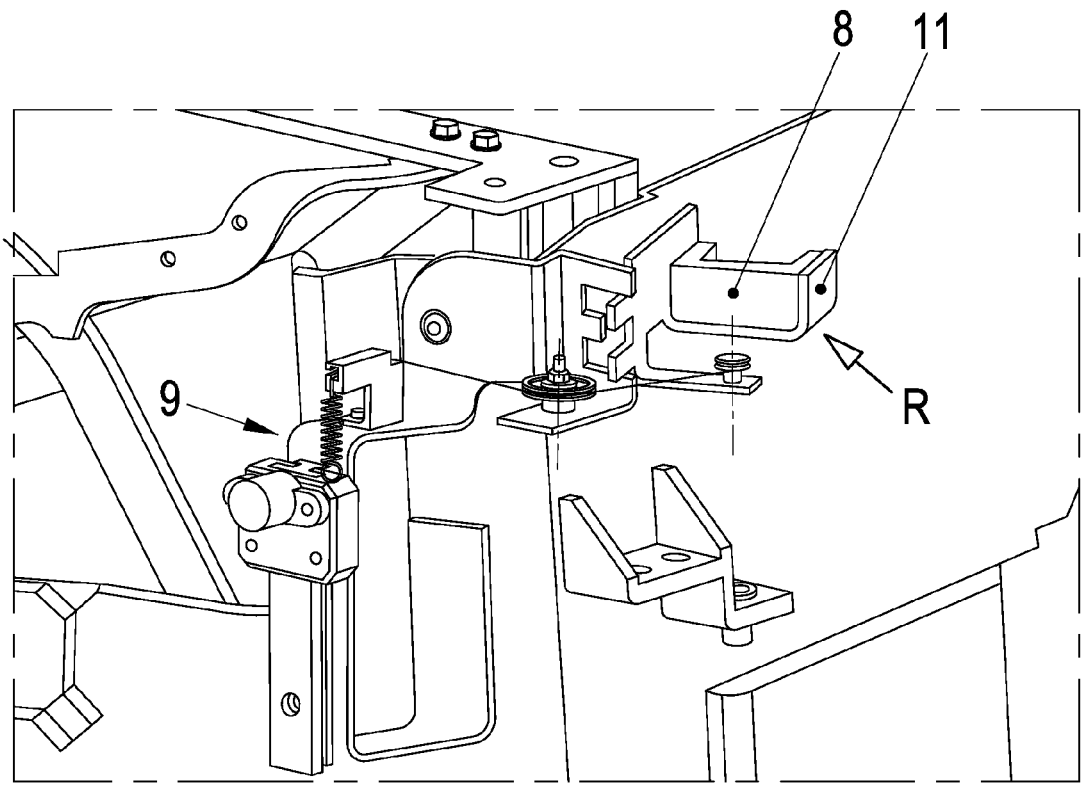
FIG. 5a is a side view of the hinge element as per FIG. 5 in an enlarged illustration in a folded-in rest position.

The hinge element 9 is comprised of an upright hinge pillar 16 that is positioned fixedly on a carrier part 15. A static hinge head 18 is arranged on a turned-up leg 17 of the hinge pillar, and the pivotable hinge arm 11 is articulated to the hinge head 18 for articulation about the vertical axis 10 (FIG. 4).

The top bearing 8 on the hinge arm 11 preferably comprises a support part 19 with side cheeks 20 for receiving the topside retention element 14. The retention element 14 of the roof element of the top system 2 is held between the cheeks 20 in the y direction in the stowage position A.

A rotary spring 22 is held on the vertical pivot axis 10 between lugs 21 and securely holds the hinge arm 11 in the folded-in rest position R.

The cable drive device 12 is arranged between the pivotable hinge arm 11 and the positionally fixed hinge pillar 16. The cable drive device 12 comprises a wire-type cable pull 23 that is connected to a carriage 24. The carriage 24 is adjustable in the z direction and is adjustable on the hinge pillar 16 by means of a linear guide. The cable pull 23 may be connected to the carriage 24 via a tensile spring 33.

The wire-type cable pull 23 is connected to the hinge arm 11 via a fastening point 26 and engages the carriage 24 via two redirection means 27, 28 on the hinge element 9. The carriage 24 is adjustable down with an action counter to the rotary spring 22 for realizing the receiving position A. One redirection means 27 on the hinge head 18 comprises a roller which is arranged on a turned-up leg 31, and the other redirection means 28 comprises a guide path mounted on a leg 17 of the hinge pillar 16.

Figure 6:
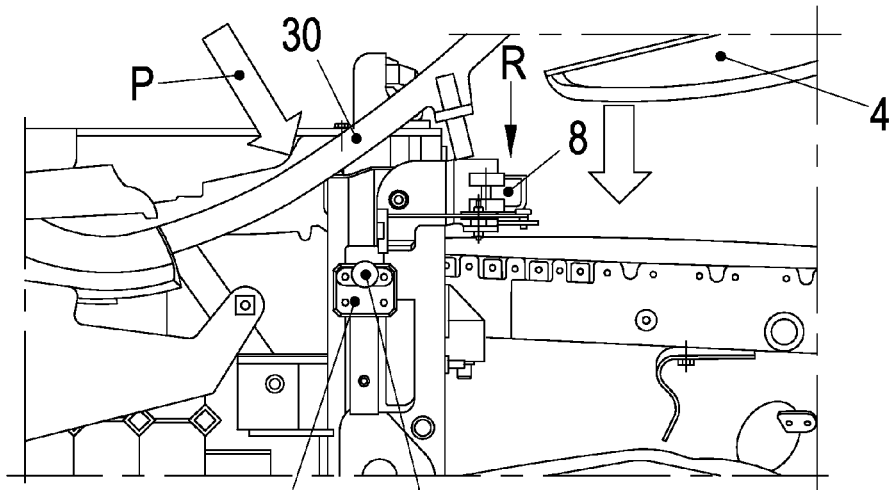
FIG. 6 is a side view of the top bearing during the opening of the top system, together with the rear window that is at risk of collision.
Figure 7:
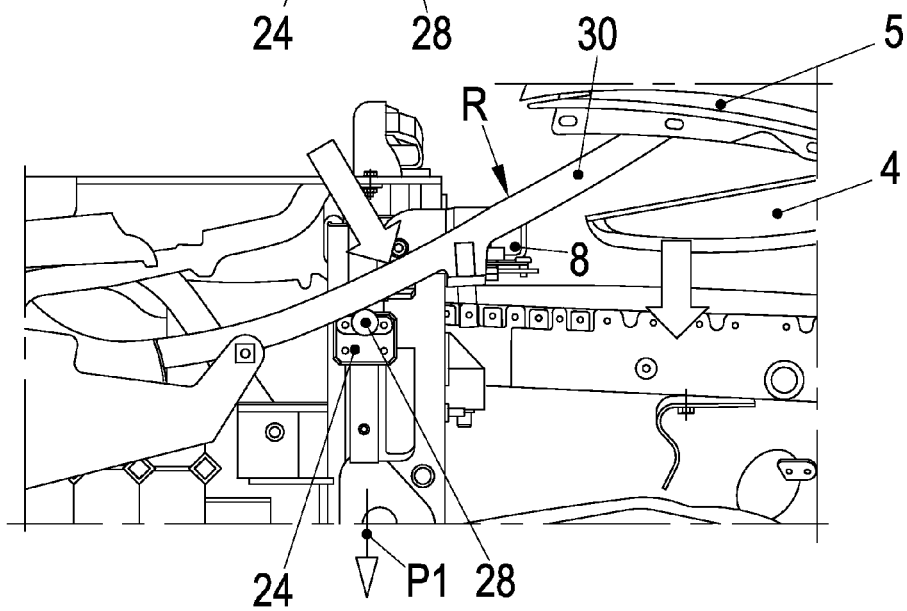
FIG. 7 shows a side view of the top bearing during the opening of the top system, and the rear window which is moving past the top bearing in the rest position.
Figure 8:
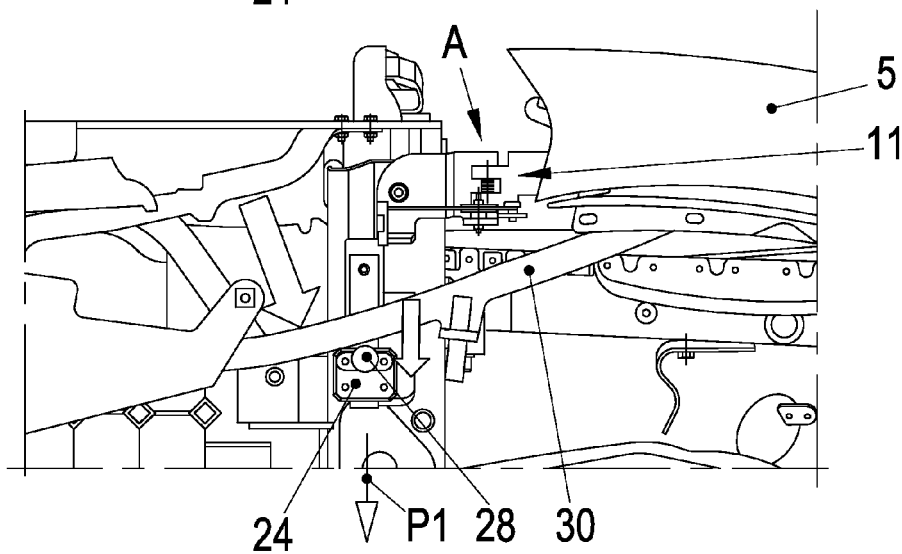
FIG. 8 shows a side view of the top bearing in a folded-out stowage position, and the exertion of load on the cable pull device.

The carriage 24 is adjusted when a stowage position of the top 5 is adopted, The carriage 24 has a projecting stop 29 that engages with the roof link 30 or a linkage of the roof system 2 that moves down in the arrow direction P due to the lowering of the top 5 (FIGS. 6 to 8). Thus, the roof link 30 acts on the stop 29 and moves the carriage 24 down in the arrow direction P1, with the cable pull 23 being driven along. In this way, the hinge arm 11, which had been in the folded-in rest position R, is pivoted into the folded-out bearing position A by the cable pull 23. The folded-out hinge arm 11 is fixed by the lugs 21 which, by way of their free ends, are supported and retained on the hinge head 18.

What is claimed is:

1. A cabriolet vehicle having a top system that can be stowed in a rear-end stowage compartment, the top system has at least one roof element, a roof link and a rear window arranged in a top lining, the top system being held in the stowage compartment by a support that comprises: a hinge element having a horizontally pivotable hinge arm and a top bearing integrated in the hinge arm, the hinge arm having a drive device actuable by the roof link of the top system and configured to pivot the hinge arm about a vertical axis from a folded-in rest position where the hinge arm is oriented transversely to the vehicle, into a folded-out bearing position, where the hinge arm extends in the vehicle longitudinal direction and the top bearing receives a support element of the at least one roof element of the top system when the top system is in the stowage compartment.

2. The vehicle of claim 1, wherein the hinge element comprises an upright hinge pillar that is positioned fixedly on a carrier part of the vehicle for supporting the hinge element relative to the vehicle, the upright hinge pillar having a turned-up leg and a static hinge head arranged on the turned-up leg and extending in the vehicle longitudinal direction, the pivotable hinge arm with the integrated top bearing being connected to the static hinge head for articulation about the vertical axis.

3. The vehicle of claim 1, wherein the top bearing of the pivotable hinge arm comprises a support with side cheeks, and a retention element of the at least one roof element being engageable between the cheeks when the top system is in the stowage compartment.

4. The vehicle of claim 2, wherein the pivotable hinge arm has lugs and a rotary spring between the lugs, the rotary spring being held on a vertical pivot axis and holding the hinge arm in the folded-in rest position.

5. The vehicle of claim 4, wherein the drive device is arranged between the pivotable hinge arm and the hinge pillar, the drive device comprising: a cable pull and a carriage that is connected to a first end of the cable pull, the carriage being linearly adjustable vertically on the hinge pillar.

6. The vehicle of claim 5, wherein the cable pull has a second end connected to a fastening point on the pivotable hinge arm, the drive device further comprising first and second redirection guides between the carriage and the hinge element and the cable pull passing through the redirection guides, the carriage being adjustable with an action counter to the rotary spring for pivoting the hinge arm into the bearing position.

7. The vehicle of claim 6, wherein the carriage has a projecting stop disposed for engagement by the roof link as the at least one roof element of the top system moves toward the stowage compartment so that the roof link engages the stop and urges the carriage toward a lower position.

8. The vehicle of claim 6, wherein the cable pull pivots the hinge arm from the folded-in rest position into the folded-out bearing position and wherein the lugs fix the hinge arm on the hinge head relative to a longitudinal direction of the vehicle when the hinge arm is in the folded-out bearing position.

9. The vehicle of claim 6, wherein the first cable redirection guide on the hinge head comprises a roller on a leg of the hinge head, and the second cable redirection guide comprises a guide path on the turned-up leg of the hinge pillar.

* * * * *